United States Patent [19]
Yang

[11] Patent Number: 5,671,221
[45] Date of Patent: Sep. 23, 1997

[54] RECEIVING METHOD AND APPARATUS FOR USE IN A SPREAD-SPECTRUM COMMUNICATION SYSTEM

[75] Inventor: Jin Yang, Vancouver, Wash.

[73] Assignees: Sharp Microelectronics Technology, Inc., Wash.; Sharp Kabushiki Kaisha, Japan

[21] Appl. No.: 490,193

[22] Filed: Jun. 14, 1995

[51] Int. Cl.$^6$ .................................................. H04J 13/00
[52] U.S. Cl. ........................ 370/320; 370/441; 375/205
[58] Field of Search ............................. 370/18, 106, 107, 370/108, 84, 19, 20, 21, 320, 324, 335, 342, 341, 329, 358, 441, 509, 513, 517, 519, 203, 206; 375/200, 205, 227, 208, 209, 210, 267, 284, 285, 275, 296, 299; 455/38.1, 54.1, 10, 50.1, 101

[56] References Cited

U.S. PATENT DOCUMENTS

| | | | |
|---|---|---|---|
| 4,672,658 | 6/1987 | Kavehrad et al. | 379/63 |
| 4,901,307 | 2/1990 | Gilhousen et al. | 370/18 |
| 5,081,643 | 1/1992 | Schilling | 375/200 |
| 5,093,840 | 3/1992 | Schilling | 375/200 |
| 5,103,459 | 4/1992 | Gilhousen et al. | 375/200 |
| 5,109,390 | 4/1992 | Gilhousen et al. | 375/200 |
| 5,164,959 | 11/1992 | Cai et al. | 375/200 |
| 5,166,951 | 11/1992 | Schilling | 375/200 |
| 5,179,571 | 1/1993 | Schilling | 375/200 |
| 5,179,572 | 1/1993 | Schilling | 375/200 |
| 5,185,762 | 2/1993 | Schilling | 375/200 |
| 5,228,056 | 7/1993 | Schilling | 375/200 |
| 5,412,686 | 5/1995 | Ling | 375/200 |
| 5,420,850 | 5/1995 | Umeda et al. | 370/18 |
| 5,442,625 | 8/1995 | Gitlin et al. | 370/18 |

OTHER PUBLICATIONS

Qualcomm Incorporated, "Most Often Asked Questions about CDMA", Aug. 23, 1991, pp. 1–8.
IEEE Transactions on Communications, "Theory of Spread-Spectrum Communications—A Tutorial", vol. Com. 30, No. 5, May 1982, pp. 855–884.
Proceedings of the IEEE, "Introduction to Spread-Spectrum Antimultipath Techniques and Their Application to Urban Digital Radio", vol. 68, No. 3, Mar. 1980, pp. 328–353.
Communications, "Code Division Multiple Access Beyond the Time Domain" by Fred Baumgartner, Feb. 1990.
Qualcomm, Inc., "CDMA Cellular the Next Generation".
Principles of Communication Systems, "Spread Spectrum Modulation" by H. Taub and Dr. Schilling, Chapter Seventeen, pp. 720–749.
Los Angeles Times, "PacTel Cellular Takes a Gamble on Technology", Business Section, Aug. 26, 1990, pp. D1 and D8.

(List continued on next page.)

*Primary Examiner*—Dang Ton
*Attorney, Agent, or Firm*—Kolisch, Hartwell, Dickinson, McCormack & Heuser

[57] ABSTRACT

The present invention involves a receiving method and apparatus for use in a communication system wherein a spread-spectrum signal containing information bits is transmitted within an environment tending to produce multipath fading. The receiving apparatus includes a channel estimator which estimates channel coefficients, preferably corresponding to the level of correlation between the various multipath components of the spread-spectrum signal and a cell-correlation signal. A channel selector is configured to select one or more of the multipath components based on the channel coefficients, typically choosing multipath components with the greatest level of correlation, a condition which is indicative of a high signal-to-noise power ratio. The channel selector also identifies time delay values representing the time delay between such selected multipath components, such time delay values being used by a spread-spectrum receiver to identify the selected multipath components for presentation on plural diversity branches. A combiner combines the diversity branches in a predetermined manner, typically by weighted summation using weighting factors produced by the channel selector. A decoder extracts information from the combined signal.

18 Claims, 7 Drawing Sheets

OTHER PUBLICATIONS

Mobile Phone News, "Qualcomm, PacTel Complete First CDMA Mobile Call: Questions are Left Unanswered", Nov. 23, 1989, Washington, D.C., vol. 7, No. 24, pp. 1-3.

Industrial Communications, "Nynex Announces CDMA Microcellular System for New York City", Aug. 10, 1990, Washington, D.C., Issue No. 31, pp. 1-2.

Radio Commuications Report, "Nynex Taps Test of CDMA System in New York City", Mar. 26, 1990, p. 4.

Business Week, "Bolting from the Cellular Herd", Aug. 20, 1990, p. 40.

The Wall Street Journal, "AT&T, 2 Bells Plan to Upgrade Cellular Systems", Aug. 2, 1990, p. B2.

Hewlett-Packard Company, "Concepts of CDMA" by Ken Thompson and Dave Whipple, 1993 Wireless Communications Symposium, pp. 22-23.

Global Communications, "Next Wave of Wireless Devices may be CDMA-Base" by Dr. Irwin M. Jacobs, Sep./Oct. 1991, pp. 36-40.

Cellular Business, "The Quest for Spectrum Efficiency" by Dan Sweeney, Jun. 1991, pp. 24-36.

RECEIVING METHOD AND APPARATUS FOR USE IN A SPREAD-SPECTRUM COMMUNICATION SYSTEM

TECHNICAL FIELD

The present invention relates generally to communication, and more particularly, to a spread-spectrum receiver method and apparatus usable in connection with a direct sequence (DS) code division multiple access (CDMA) communication system.

BACKGROUND ART

Although CDMA communication systems still are relatively new, it is apparent that such systems represent a significant improvement in communication technology, particularly in view of the ever-increasing requirements for user capacity, signal accuracy, and message security. This improvement is nowhere more apparent than in a wireless communication system such as a digital cellular telephone system whereby a number of users, or subscribers, communicate from within defined geographic areas, or cells. In such a system, each cell includes a base station, or cell site, which controls communication between in-cell users, nonsystem users and other cell sites.

In a conventional CDMA digital cellular telephone system, there are two links over the air from a subscriber unit (i.e., a cellular phone or handset) to a cell site, and from the cell site to the subscriber unit. For the first link, i.e. from the subscriber unit to the cell site, an analog voice signal is picked up at the subscriber unit where it is processed and fed to a vocoder which transforms the processed signal into a digital information bit stream. Typically, the vocoder takes advantage of the idiosyncracies of human speech to vary the rate at which it converts the signal to digital information bits (e.g., it need only sample a pause or other dead space at a very low rate). The information bits are framed, convolution encoded and interleaved, and then are multiplied by a unique user code sequence which effectively spreads the spectrum in a highly controlled, but apparently random, way. The spread signal is modulated onto a radio frequency carrier for transmission to the cell site.

The cell site receives the signal transmitted by the intended subscriber unit, along with signals from all other in-cell users, and feeds them to a series of receivers where such signals are demodulated and de-spread. Each receiver thus is left with only the original voice information bits from the corresponding user. These information bits then are used to produce a facsimile of the original speech. The information bits are again framed, convolution encoded, interleaved and spread, for the second link, i.e. cell site to subscriber unit, of the cell site this time according to the intended subscriber unit's user code sequence. The signal is modulated onto the radio frequency carrier of the sending cell site. A power control system typically is used to keep the RF output of each phone to a minimum, thereby decreasing interference between cells.

Considering now a typical spread-spectrum receiver of a CDMA digital cellular telephone system, it will be understood that a signal r(k), which is the signal incident upon the spread-spectrum receiver at discrete time k (the time interval for k is a sample interval $T_{cs}$, which may be the same as chip interval $T_c$, or a fraction of the chip interval), may be described by the equation:

$$r(k) = s(k)\,h(t,\tau) + s_p(k)\,h(t,\tau) + i_o(k)\,h(t,\tau) + I_{oc}(k)$$

where s(k) is a coded source signal sent to the intended receiver, $s_p(k)$ is a PILOT channel signal, and $i_o(k)$ is same-cell interference (including other user source signals, interferences and artifacts from the PAGE and SYNC channels). h(t,τ) is a same-cell multipath fading channel model, which may be expressed in accordance with the equation:

$$h(t,\tau) = \sum_{j=0}^{m-1} c_j(t)\delta(t-\tau_j)$$

where $c_j(t)$ is a weighting factor for multipath component j, $\delta(t-\tau_j)$ is a delta function, and m is the total number of multipath components. t represents time. τ is the time delay spread. $I_{oc}(k)$ includes both other-cell interference and thermal noise and may be expressed as:

$$I_{oc}(k) = \left[\sum_{j=1}^{u} s_j(k) h_j(t,\tau)\right] + n_o(k)$$

where $s_j(k)$ is a coded source signal of other-cell j, $h_j(t,\tau)$ is a multipath fading channel model of the other-cell and $n_o(k)$ is thermal noise. u represents the total number of other cells which contribute to $I_{oc}(k)$. Received signal r(k) is shown diagrammatically in FIG. 1.

It will be appreciated that only the signal components which are specifically to be sent to the intended receiver are coded with the intended receiver's user code sequence and frequency. All others are coded with other code sequences, other frequencies, or are not coded at all. Interference, including interference from other users, noise and other artifacts, thus effectively may be reduced relative to the intended signal because such interference is relatively uncorrelated with a given user code sequence and frequency while the intended signal is relatively highly correlated with such user code sequence and frequency. It will be understood, however, that achieving the highest cost-effective performance requires a high degree of correlation between the received information and the transmitted information, but it does not require, and typically does not achieve, complete correlation.

Use of the terms correlated and correlation herein will be understood to be relative rather than absolute. Thus, a relatively high correlation between codes, sequences, waveforms or signals may be referred to as a correlation. Conversely, codes, sequences, waveforms or signals with a relatively low correlation therebetween may be referred to as being uncorrelated. User code sequences sometimes are referred to as being nearly orthogonal, meaning that they have little cross-correlation with one another.

It will be appreciated by those skilled in the art that CDMA communication takes advantage of spatial diversity, frequency diversity and time diversity (which of course is related by distance to spatial diversity). In conventional CDMA communication systems rake receivers have been used to utilize time diversity, such receivers being convenient because they are capable of collecting signal energy from various received signal paths that fall within the span of delayed time intervals and carry the same user code sequence. A conventional rake receiver will be understood to include plural samplers, a weighted summer and a decision circuit. Such rake receivers have been shown to provide a practical, robust solution for multipath fading in cellular telephone communication systems.

U.S. Pat. No. 5,081,643 entitled SPREAD SPECTRUM MULTIPATH RECEIVER APPARATUS AND METHOD, which issued Jan. 14, 1992, describes apparatus for adapting a receiver to identify the path having the greatest amplitude in a spread-spectrum signal characterized by multipath components. A first correlator correlates the spread-spectrum signal received at the input with a chip code signal representing a first time delay. A second correlator correlates the spread-spectrum signal received at the input with a chip code signal representing a second time delay. A comparator generates first and second time delay indicator signals by comparing the outputs of the two correlators.

U.S. Pat. No. 5,103,459 entitled SYSTEM AND METHOD FOR GENERATING SIGNAL WAVEFORMS IN A CDMA CELLULAR TELEPHONE SYSTEM, which issued Apr. 7, 1992, describes a communication system and method for use in a CDMA cellular telephone system in which signals are communicated from a cell-site to a mobile unit using direct-sequence, spread-spectrum techniques. Pilot, synchronization, paging and voice channels are defined by encoding, interleaving, bi-phase shift key modulating with orthogonal covering of each symbol, along with quadrature phase shift key spreading of the covered symbols.

U.S. Pat. No. 5,109,390 entitled DIVERSITY RECEIVER IN A CDMA CELLULAR TELEPHONE SYSTEM, which issued Apr. 28, 1992, describes a diversity receiver for use in a CDMA cellular telephone system in which PN processing gain and time discrimination properties of such coding are used to determine the location in the time domain and the received signal strength of the received pilot signal for each of multiple paths. A searcher receiver provides a control signal indicative of the received pilot signals of greatest strength and their corresponding time relationship. A data receiver receives spread-spectrum communication signals accompanying such received pilot signals and, responsive to the searcher control signal, acquires and demodulates a spread-spectrum communication signal that corresponds to the pilot signal of greatest signal strength.

Finally, U.S. Pat. No. 5,228,056 entitled SYNCHRONOUS SPREAD-SPECTRUM COMMUNICATIONS SYSTEM AND METHOD, which issued Jul. 13, 1993, describes a synchronous spread-spectrum communications system and method in which a combiner combines a chip code signal with a spread-spectrum processed signal and in which a receiver message mixer despreads the spread-spectrum communications signal as a modulated data signal. Synchronization relies on a tracking and acquisition circuit that uses a recovered carrier signal produced by the spread-spectrum communications signal transmitter.

The use of CDMA communication is expected to significantly increase capacity in cellular telephone systems by increasing the signal-to-noise ratio (SNR) within each channel so as to improve the receiver's ability within the channel to differentiate between an intended receiver's source signal and noise (including interference made up of transmissions not intended for the given receiver and thermal noise). Nevertheless, practical problems have arisen in CDMA rake receiver field deployment. These problems include propagation path loss, time delay spread, external interference, geographic distribution and the relationship between diversity gain and self-interference due to uncaptured energy within an arm of the rake receiver. Such problems have resulted in CDMA capacity reductions and voice quality degradation.

DISCLOSURE OF THE INVENTION

Briefly, the present invention involves a receiving apparatus for use in a communication system wherein a spread-spectrum signal is transmitted within an environment tending to produce multipath fading. The receiving apparatus includes a channel estimator which estimates channel coefficients, such coefficients preferably corresponding to the level of correlation between various multipath components of the spread-spectrum signal and a cell-correlation signal. A channel selector is configured to select one or more of the multipath components based on the channel coefficients, typically choosing multipath components with the greatest level of correlation which is indicative of a high signal-to-noise power ratio. The channel selector also identifies time delay values representing the time delay between such selected multipath components, the time delay values being used by a spread-spectrum receiver to identify the selected multipath components for presentation on diversity branches. A combiner combines the diversity branches in a predetermined manner, typically by weighted summation using weighting factors produced by the channel selector. A decoder extracts information from the combined signal and outputs the information which is used to produce synthesized speech.

The invention also involves a receiving method for use in a communication system, the method typically involving: 1) receiving a spread-spectrum signal having multipath components; 2) selecting one or more of such multipath components based on predetermined selection criteria; 3) determining time delays between the selected multipath components; 4) determining weighting factors for the selected multipath components; 5) processing the spread-spectrum signal by operation thereon by selected time-delayed versions of a user-correlation signal to produce processed signal components; 6) integrating each processed signal component during a predefined time period to produce corresponding integration results; 7) weighting the integration results using the weighting factors; 8) summing the weighted integration results to produce a summed output; and 9) decoding the summed output by quantizing such output and comparing such output to a predefined threshold value, thereby to extract information from the summed output. The processing step may include multiplying the spread-spectrum signal by a user-correlation signal in the form of a user code sequence which is defined by multiplication of a pseudo-random number (PN) sequence and an orthogonal cover sequence, or alternatively, by modulo-2 adding the PN sequence and the orthogonal cover sequence.

The channel estimator and channel selector typically are embodied by a search engine which identifies the multipath components having the highest level of correlation to the PN sequence. As a result, the invented apparatus exhibits an increased signal-to-noise ratio and quickly adapts to variable diversity paths that are characteristic of mobile wireless communications. By combining weighted outputs the method maximizes diversity gain. Thus, the invention addresses the time delay spread and self-interference due to uncaptured energy problems that characterize conventional rake receiver approaches in CDMA communications.

These and additional objects and advantages of the present invention will be more readily understood after consideration of the drawings and the detailed description of the preferred embodiment.

DETAILED DESCRIPTION OF THE PREFERRED EMBODIMENT AND BEST MODE OF CARRYING OUT THE INVENTION

Figure 1:
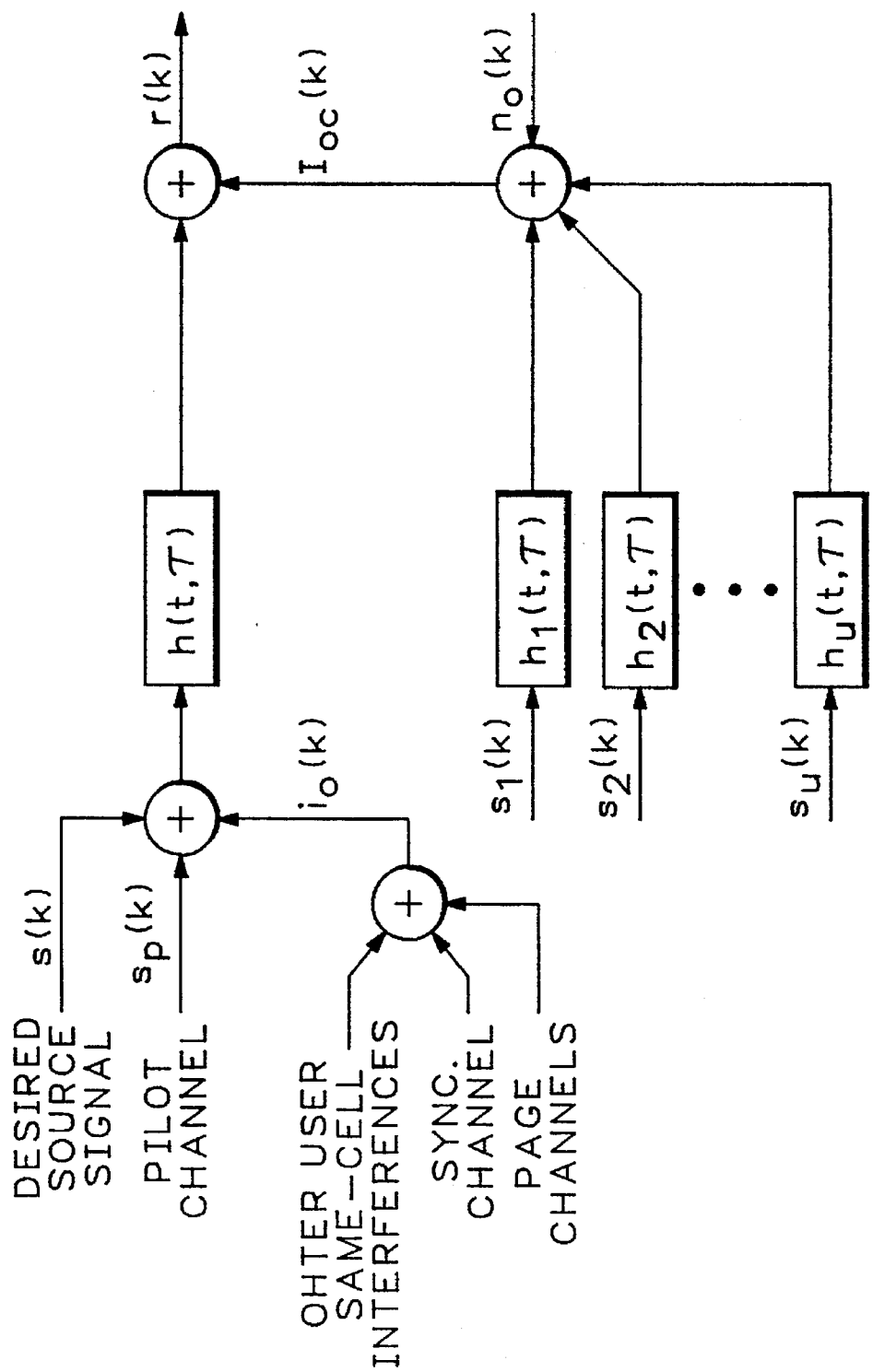
FIG. 1 is a block diagram which illustrates signal and noise factors that bear on a spread-spectrum receiver apparatus.

In a typical spread-spectrum signal of a CDMA cellular telephone system as diagrammed, it will be understood that a desired source signal $s(k)$ will be corrupted by effects from a variety of sources, including a PILOT channel artifact, interference from other users (both within the same cell and from other cells), mobile channel fading, and thermal noise. These effects add to the desired source signal, producing a received signal which is significantly different from that sent. FIG. 1 shows a typical received signal $r(k)$ which is made up of the desired source signal $s(k)$, the PILOT channel signal $s_p(k)$, same-cell interference $i_o(k)$, other-cell interference and thermal noise.

As indicated, same-cell interference $i_o(k)$ includes the source signals of all other in-cell users, the SYNC channel signal, and the PAGE channel signal. Other-cell interference $I_{oc}(k)$ includes the source signals from all other cells (identified as $s_1(k), s_2(k), \ldots s_u(k)$), along with thermal noise $n_o(k)$. All in-cell signals pass through a fading multipath channel characterized by the channel model $h(t,\tau)$. The source signals sent by other-cell users pass through fading multipath channels corresponding to their respective cell sites. In FIG. 1, the fading multipath channels of the other cells are represented by channel models $h_1(t,\tau), h_2(t,\tau), \ldots h_u(t,\tau)$ which correspond to source signals $s_1(k), s_2(k), \ldots s_u(k)$, respectively. Received signal $r(k)$ thus contains both a desired, or intended, source signal component, and various undesired signal components including interference and thermal noise. It is, however, only the desired source signal $s(k)$ which contains the information that defines the intended speech.

Figure 2:
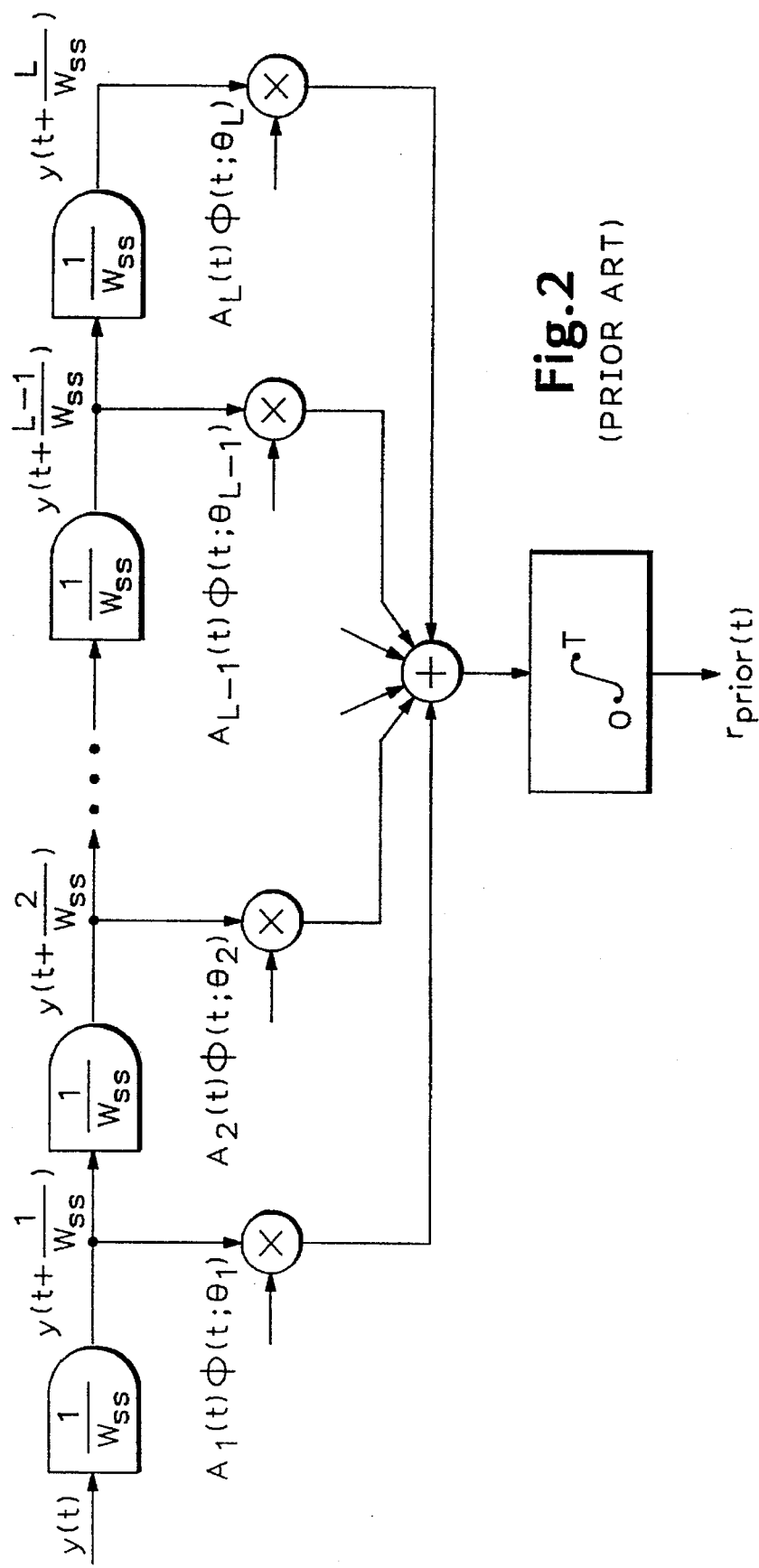
FIG. 2 illustrates a prior art rake receiver circuit used in spread-spectrum signal reception.

Turning now to FIG. 2, an idealized prior art rake receiver is shown in block diagram form, such receiver including a plurality of data receiver arms (represented in FIG. 2 as time-delaying buffer gates, each characterized as imposing a $1/W_{ss}$ time delay). The data receiver arms are suggestive of a rake's fines, the arms being cascaded such that they present incrementally time-delayed versions of a received signal $y(t)$. It thus will be appreciated that their individual diversity components may be expressed as $y(t+(j/W_{ss}))$ where t is time and $j=1, 2, \ldots L$ for an L-branch rake receiver. Each diversity component is multiplied by a predefined transfer function $A_j(t)\phi(t,\theta_j)$, and the resultant products are summed, or integrated, over time interval T (corresponding to the system's symbol rate) to produce output $r_{prior}(t)$. The output of the rake receiver of FIG. 2 thus approximates the transmitted signal at the transmission site.

Figure 3:
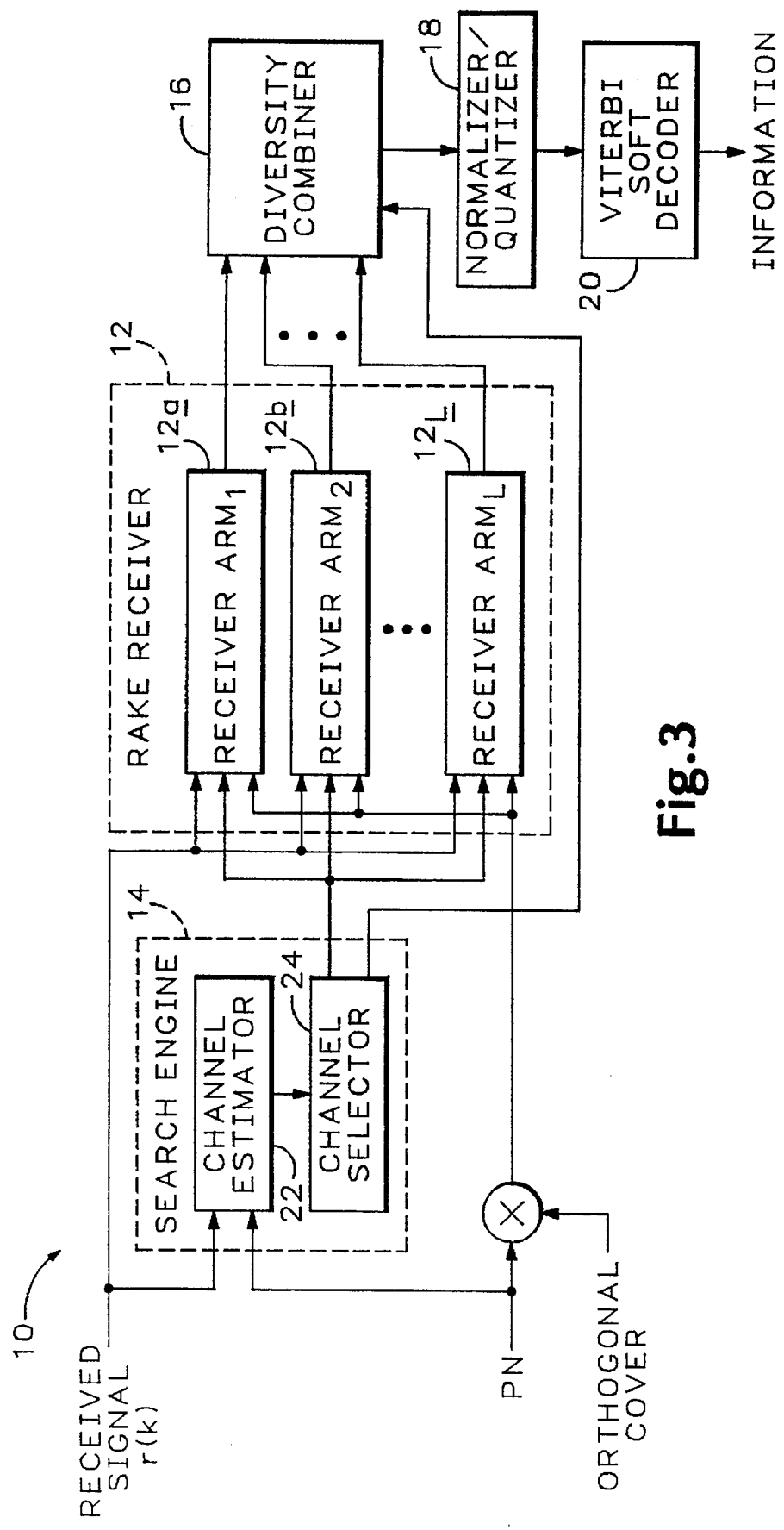
FIG. 3 is a block diagram of a receiver apparatus constructed in accordance with a preferred embodiment of the present invention.

In contrast, the invented receiver apparatus is shown at 10 in FIG. 3, such apparatus taking the form of a mobile receiver unit for use in a CDMA digital cellular telephone system. As indicated, apparatus 10 includes a rake receiver 12 having L receiver arms 12a, 12b, ... 12L (also known as diversity branches), all of which receive a received signal, designated r(k). The receiver arms also receive a common user-correlation signal in the form of a unique user code sequence defined by multiplication of a PN sequence by an orthogonal cover sequence, so designated. Time delays are imposed upon receiver arms 12a, 12b, ... 12L by a search engine 14.

In the preferred embodiment, search engine 14 includes a channel estimator 22 which considers a first quantity of multipath components, and a channel selector 24 which selects a second lesser quantity of multipath components for presentation on the rake receiver's receiver arms. The channel estimator estimates correlation between a cell-correlation signal and the various multipath components. The channel selector selects those components with the greatest correlation and adapts the rake receiver for presentation of such selected components on the receiver arms. The outputs of the receiver arms thus represent various selected multipath components of the desired source signal $s(k)$, such components having been extracted from the received signal $r(k)$.

The outputs of the receiver arms are input to a diversity combiner 16, which also receives weighting factors from the search engine to enable the combiner to produce a weighted sum of its diverse inputs. The output of combiner 16, in turn, is input to a normalizer/quantizer 18, which scales and shifts the input to within a predefined range. The output of normalizer/quantizer 18 is decoded by a soft Viterbi decoder 20, the output of such decoder representing the received information that was initially contained within the source signal $s(k)$.

Figure 4:
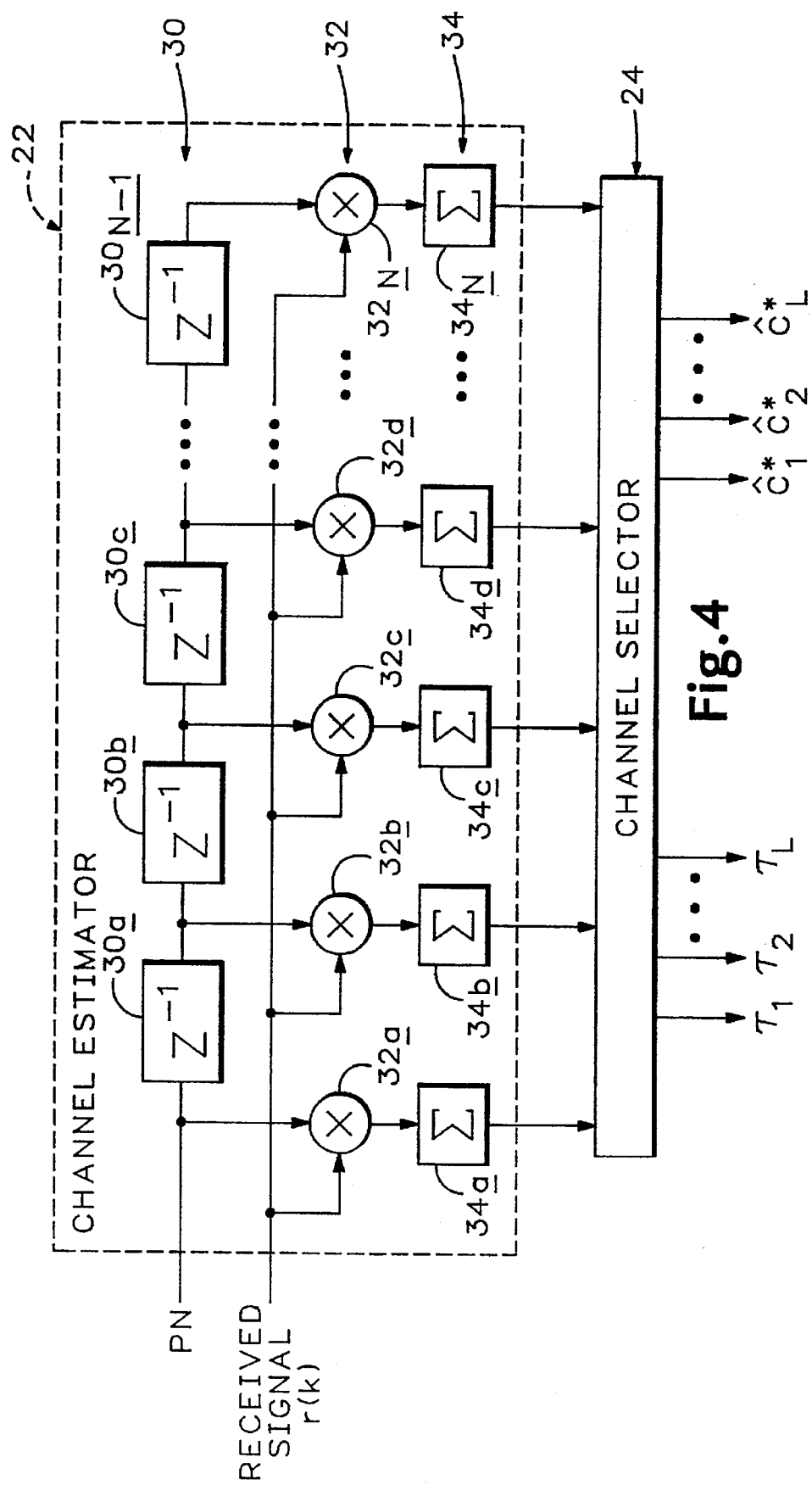
FIG. 4 is a schematic diagram of a search engine including a channel estimator and channel selector for use in the receiver apparatus shown in FIG. 3.

Turning next to FIG. 4, where channel estimator 22 is shown in greater detail, it will be noted that such channel estimator determines a channel coefficient for each of N multipath components. This is accomplished using a time delay arrangement 30 including a plurality of time delays 30a, 30b, 30c, ... 30N-1, which cream successively time-delayed versions of the channel estimator's cell-correlation signal (which, in the depicted embodiment, is the PN sequence). In the depicted embodiment, each version of the cell-correlation signal is delayed a first predetermined time $T_{cs}$ (represented by $Z^{-1}$ in FIG. 4) relative to the next-previous correlation signal version, time $T_{cs}$ generally being chosen in accordance with the system's chip interval.

The received signal is considered within the channel estimator by operation of a processor arrangement (indicated generally at 32) which multiplies the received signal by the successively time-delayed versions of the cell-correlation signal. Processor arrangement 32, it will be noted, includes a series of multipliers 32a, 32b, 32c, 32d, ... 32N, each of which multiplies a version of the cell-correlation signal by the received signal to produce a corresponding multipath correlation component. Each multipath correlation component is integrated over a second predefined interval of time (i.e., a symbol interval) by an integrator arrangement 34 which includes a plurality of integrators, or summers 34a, 34b, 34c, 34d, ... 34N. Each integrator operates to produce a channel coefficient corresponding to the level of correlation over the second predefined interval of time (i.e., a symbol interval T).

The channel estimator thus will be understood to provide estimated channel coefficients $ĉ_j(i)$ at discrete time i (where the time interval for i is the symbol interval T) in accordance with the equation:

$$\hat{c}_j(i) = K_c \sum_{k=(i-1)T/T_{cs}}^{iT/T_{cs}} r(k) w^*_{pilot}(k-\tau_j) p^*(k-\tau_j), j=1,\ldots,N$$

where $K_c$ is a constant, $\tau_j$ is the indexed time delay shift of multipath component j, $w^*_{pilot}(k-\tau_j)$ is the orthogonal spread waveform for the pilot channel, and $p^*(k-\tau_j)$ is the PN sequence for the user's cell site, as acquired from the pilot channel. In accordance with the TIA/EIA/IS-95 standard, $w^*_{pilot}(k-\tau_j)=-1$. Channel estimator 22 thus may be considered to estimate correlation between the received signal and the PN sequence simply by multiplication of the PN sequence and the received signal, and summation (or integration) of such product over a predetermined time interval.

As indicated, the channel estimator outputs the channel coefficients to channel selector 24, which selects the multipath components having the greatest level of correlation (i.e., the greatest signal-to-noise power ratios as determined by a sliding, or running average approach). This sliding average is estimated by a fixed length block average, where the block is moving along the time axis at a symbol rate. The selected multipath components are identified by the time delay between such selected multipath components which are represented by time delay values $\tau_1, \tau_2, \ldots \tau_L$ as output by channel selector 24. The time delay values are updated at a rate which is sufficiently low to avoid excessive crosscorrelation error, but sufficiently high to track temporal variations in the multipath components. The time delay values are output to the rake receiver arms, which utilize such values to identify the L maximal correlation multipath components for presentation on diversity receiver arms 12a, 12b, ... 12L. The channel selector also outputs estimated weighting factors $\hat{c}_1^*, \hat{c}_2^*, \ldots \hat{c}_L^*$ which typically are complex conjugates of corresponding channel coefficient inputs. The weighting factors are output to diversity combiner 16 for use in providing a weighted sum of the selected multipath components as will described below.

Figure 4A:
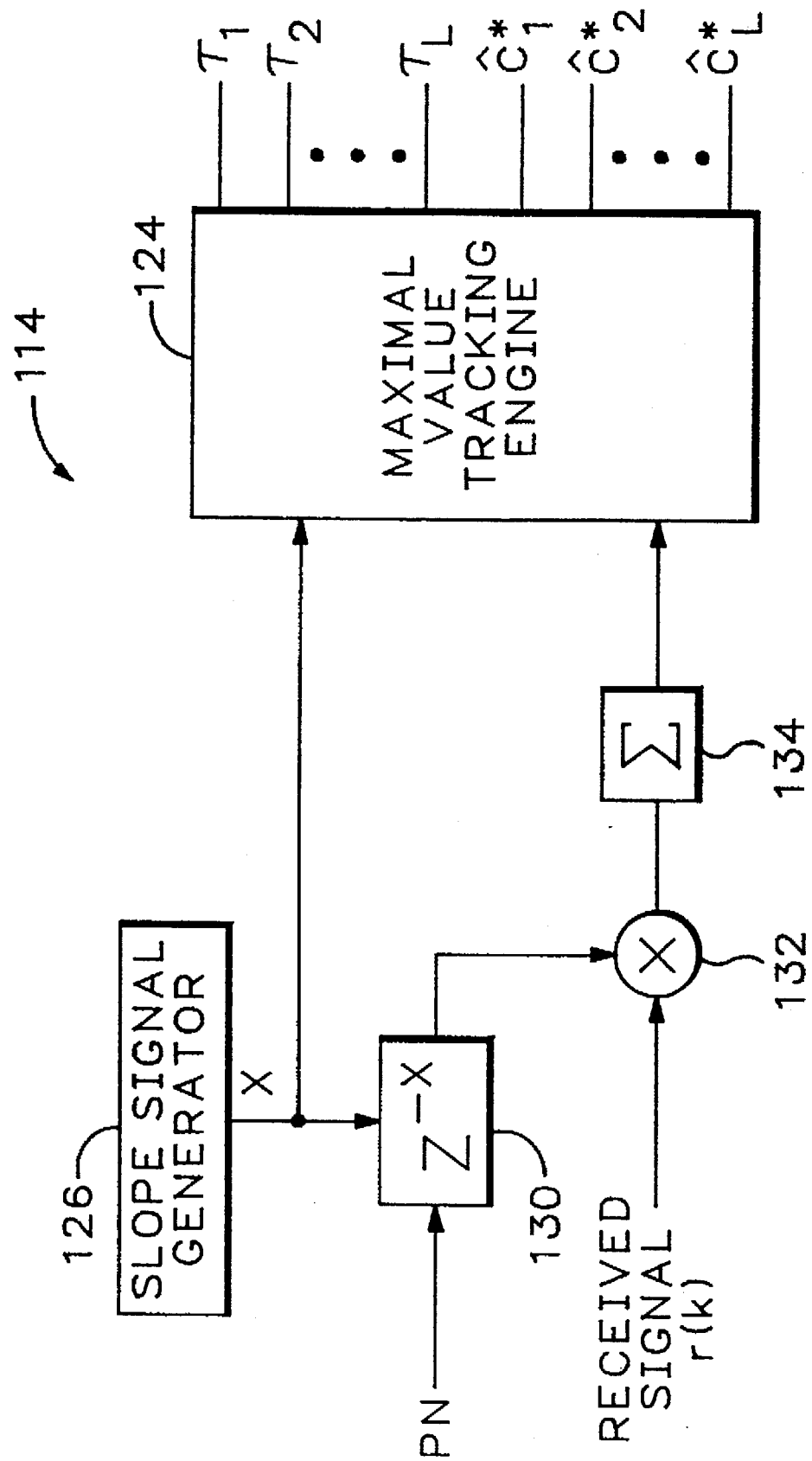
FIG. 4A is a schematic diagram of an alternative embodiment of the search engine which forms a part of the receiver apparatus of FIG. 3.

Referring now briefly to FIG. 4A, which represents an alternative embodiment of the invented search engine, it will be seen that the previously described search engine 14 may be replaced by an adaptive search engine 114 which includes a delay value generator in the form of slope signal generator 126 which is capable of producing successive (generally increasing) time delay values x. The time delay values are output to a variable time delay 130 which also receives a cell-correlation signal in the form of a PN sequence. Time delay 130 thus is configured to produce successive time-delayed versions of the cell-correlation signal at time delay intervals which change with time delay value x.

The time delayed versions of the cell-correlation signal are output to a processor arrangement 132, which receives the spread-spectrum signal, and processes such signal by multiplication with the present time-delayed version of the cell-correlation signal. This operation produces a multipath correlation component which is passed to an integrator, or summer, 134 for integration of the multipath correlation component over a predefined interval of time. This occurs for each successive time interval, integration preferably being performed in accordance with a trapezoidal rule which is well known in the art. The resultant product of each integration is a channel coefficient which is passed on to a tracking engine 124.

The tracking engine tracks a predefined number (L) of maximal channel coefficients which are produced by the integrator, and determines corresponding weighting factors for use by diversity combiner 16. With each weighting factor, the tracking engine will receive a corresponding time delay value x from slope signal generator 126. The tracking engine thus selects the multipath components having maximal correlation (as defined by the channel coefficients), and identifies such multipath components using corresponding time delay values received from slope signal generator 126.

Figure 5:
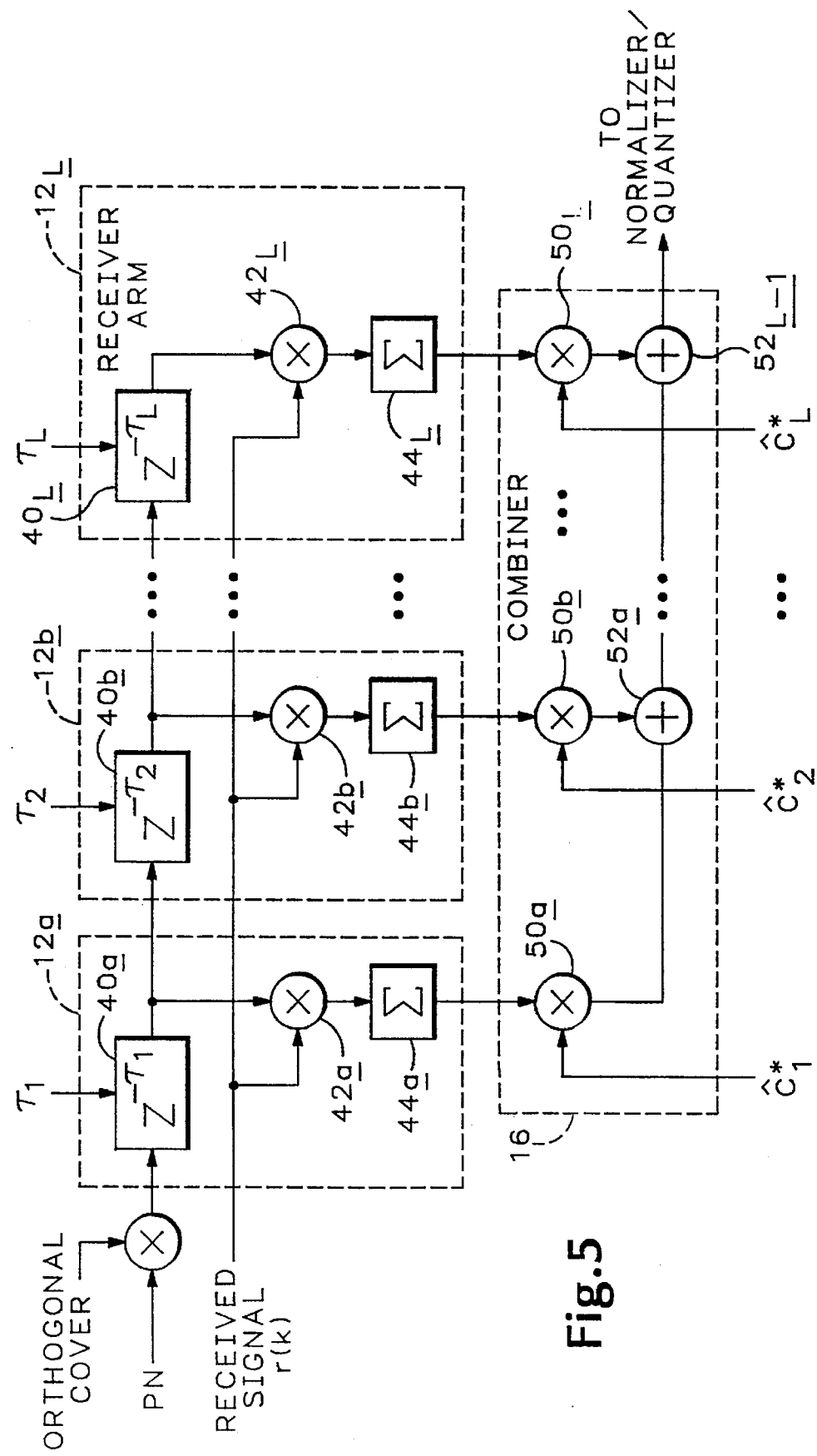
FIG. 5 is a schematic diagram of a rake receiver and combiner of the receiver apparatus shown in FIG. 3.

Turning now to FIG. 5, rake receiver 12 and diversity combiner 16 will be described in greater detail. As indicated, rake receiver 12 serves to present selected multipath components on plural receiver arms (or diversity branches) 12a, 12b, ... 12L for weighted combination by combiner 16 to produce a signal which may then be normalized, quantized and decoded. Each receiver arm of rake receiver 12 has an output signal that may be described by the following equation:

$$V_j(i) = Re\left[ \sum_{k=(i-1)T/T_{cs}}^{iT/T_{cs}} r(k) w^*_{user}(k-\tau_j) P^*(k-\tau_j) \right], j=1,2,\ldots L$$

where Re denotes the real part of the bracketed complex number, $w^*_{user}(k)$ refers to the user's orthogonal cover sequence and L is the total number of rake receiver arms. r(k) is the received signal, $p^*(k-\tau_j)$ is the PN sequence. Combiner 16 thus combines the outputs of L rake receiver arms in a predetermined manner. The multipath components presented on the rake receiver arms correspond to the multipath components with the L largest values of channel coefficient amplitudes as defined by $\tau_1, \tau_2, \ldots \tau_L$ which are received from the channel selector. This may be expressed by the following equation:

$$y_m(i) = \sum_{j=1}^{L} \hat{c}^*_j(i) V_j(i)$$

where $y_m(i)$ is the weighted sum of the selected multipath components for symbol i. The combiner thus will be understood to operate at the symbol rate, each new symbol having a new summed output based on newly selected multipath components as previously described.

Focussing more particularly on the receiver arms, it will be noted that each receiver arm includes a variable time delay 40a, 40b, ... 40L which receives a time delay value input ($\tau_1, \tau_2, \ldots \tau_L$) from channel selector 24. As indicated, the time delays each operate on a user-correlation signal which takes the form of a unique user code sequence (defined by multiplication (or modulo-2 addition) of the PN sequence and the orthogonal cover sequence as indicated) to produce time-delayed versions of the user-correlation signal. The time-delayed versions of the user-correlation signal are received by processors 42a, 42b, ... 42L, where each time-delayed version of the user-correlation signal is multiplied by the received signal to produce a corresponding processed signal. The processed signals each are integrated via integrators, or summers, 44a, 44b, ... 44L, which integrate the processed signals over the second predefined time interval (i.e., the symbol interval) so as to produce integration results. The integration result of each receiver arm is then passed to the combiner where it is multiplied (using multipliers 50a, 50b, ... 50L) by a corresponding weight factor $\hat{c}_1^*, \hat{c}_2^*, \ldots \hat{c}_L^*$ (from selector 24) to produce corresponding weighted products. The weighted products are then summed using summers (52a, ... 52L-1) to produce a summed output, or combined signal for passage to normalizer/quantizer 18.

In some implementations, the information bit rate may include voice information that has been convolution-encoded. In such case, a Viterbi decoder may be used to perform convolution decoding. (If such information is not convolution encoded, then no Viterbi decoder is needed.) The decision variable is a normalized combiner output that is adjusted to the input data range of Viterbi soft decoder 20. The decision variable may be expressed as follows:

$$U_m(i) = K_u \frac{Re\left[\sum_{j=1}^{N} \hat{c}^*_j(i)V_j(i)\right]}{\sum_{j=1}^{N} \hat{c}_j(i)\hat{c}^*_j(i)}$$

where Re denotes the real part of the bracketed complex number, and $K_u$ is the input data range for soft decoder quantilization.

Figure 6:
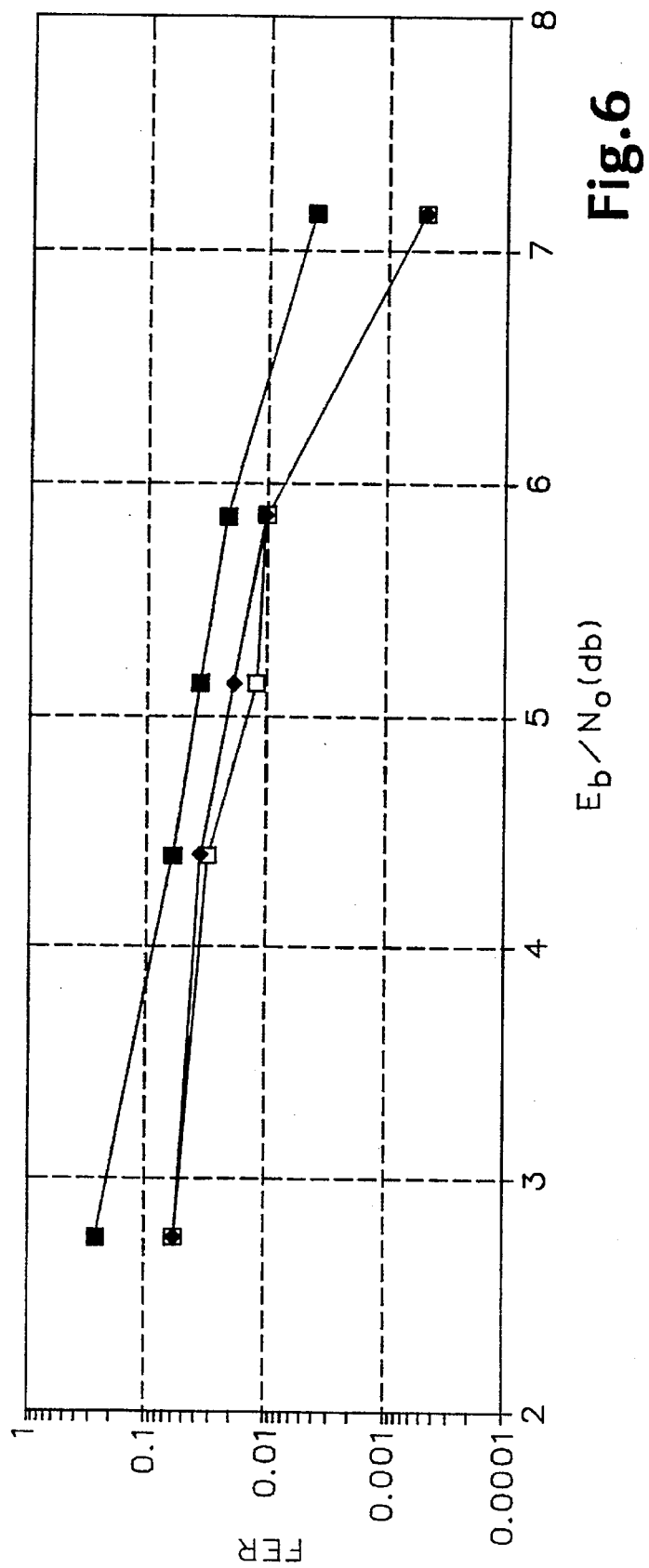
FIG. 6 is a graphical illustration of a comparison between the frame error rate (FER) v. the bit-energy-to-noise-density ratio ($E_b/N_o$) for prior art receivers and for the invented receiver apparatus.

Turning finally to FIG. 6, the advantages of the invented receiving method and apparatus are illustrated graphically. The frame error rate (FER), as a ratio, is plotted along the ordinate and the bit-energy-to-thermal-noise-density ratio $E_b/N_o$ (in decibels) is plotted along the abscissa, for three differently configured receiving systems. In each case, the pilot channel transmitted power is set to 0.2 and each user's channel transmitted power is set to 0.8/63 (where 63 is the maximum number of users in a cell), and a simulated mobile unit speed (as though it were in a speeding vehicle) is at 100 kilometers/hour (100 km/hr). The segmented line connecting solid or filled squares represents a classic five-arm rake receiver system, without normalization. The segmented line connecting blank or outline squares represents a classic five-arm rake receiver system, with normalization. Finally, the segmented line connecting solid or filled diamonds represents a selected three-arm rake receiver system (N=5, L=3), with normalization, i.e., one made in accordance with the invention. It will be appreciated that the illustrated results are achievable in accordance with the preferred embodiment of the invention, although of course better results may be possible with alternative embodiments nevertheless within the spirit and scope of the invention.

It may be seen from FIG. 6 that simply normalizing the output of the combiner improves (lowers) the FER at all pertinent decibel levels. It may also be seen that, by normalizing the output of a selected-arm receiver system such as that described herein as having an adaptive search engine, the FER may be reduced significantly and nearly to the level of the five-arm, normalized system. Thus, with fewer receiver arms, nevertheless the selected and normalized three-arm receiver system achieves nearly the performance of a normalized five-arm system, but with less complexity and cost. With fewer receiver arms, moreover the selected and normalized three-arm receiver system achieves better performance than a conventional non-normalized five-arm system. Stated another way, to achieve FER<0.01, a normalized five-arm receiver system needs 1 db less $E_b/N_o$ than a non-normalized five-arm receiver system, and a selected, normalized three-arm receiver system needs 0.5 db less $E_b/N_o$ than a non-normalized five-arm receiver system.

Those of skill in the art will appreciate that the above improvements are only illustrative of the many advantages of the invention, and are not in any way a limitation on the scope of the invention as it is defined by the claims. More and less significant improvements in spread-spectrum cellular telephone systems are achievable by, and are within the spirit and scope of, the invention. It will be appreciated then that the invented method and apparatus provide a performance and cost advantage over conventional rake receiver systems that do not normalize the combiner's output, or that do not select those rake receiver arms exhibiting the highest magnitude mean values, or that do neither. Acceptable FERs are achieved by the use of either or preferably both selection and normalization, as in accordance with the invention.

Accordingly, while the present invention has been shown and described with reference to the foregoing preferred method and apparatus, it will be apparent to those skilled in the art that other changes in form and detail may be made therein without departing from the spirit and scope of the invention as defined in the appended claims.

I claim:

1. A receiving apparatus for use in a code division multiple access (CDMA) communication system wherein a spread-spectrum signal containing information bits is transmitted within an environment tending to produce multipath components, the receiving apparatus comprising:

a channel estimator configured to estimate channel coefficients corresponding to such multipath components for use in selecting multipath components;

a channel selector configured to select one or more of the multipath components based on said channel coefficients, said channel selector producing time delay signals representing the time delay between such selected multipath components and producing weighting factors for each selected multipath component based on said channel coefficients;

one or more diversity branches configured to operate on the spread-spectrum signal using time-delayed versions of a user-correlation signal to present said selected multipath components on said diversity branches, said time-delayed versions being determined by said time delay signals;

a combiner configured to combine said diversity branches in a predetermined manner to produce a combined signal; and a decoder configured to extract the information bits from said combined signal.

2. The receiving apparatus of claim 1, wherein each channel coefficient represents a level of correlation between a multipath component and a user-correlation signal, said channel selector selecting multipath components with the greatest level of correlation.

3. The apparatus of claim 1, wherein said combiner is configured to multiply each one of said selected multipath components by a corresponding weighting factor and to sum the products to produce said combined signal.

4. The apparatus of claim 3, wherein said weighting factors are complex conjugates of said channel coefficients.

5. The apparatus of claim 1, wherein said channel selector updates said time delay values at a time interval which is greater than one symbol interval.

6. The apparatus of claim 1, wherein said channel estimator includes a processor arrangement for multiplying the spread-spectrum signal by successively time-delayed versions of a cell-correlation signal to produce multipath correlation components, and an integration arrangement for integrating each multipath correlation component over a symbol interval to produce a channel coefficient corresponding to each multipath correlation component.

7. The apparatus of claim 6, wherein said successively time-delayed versions of the cell-correlation signal are separated each by one chip interval.

8. The apparatus of claim 6, wherein said successively time-delayed versions of the cell-correlation signal are separated each by a fraction of one chip interval.

9. A receiving method for use in a code division multiple access (CDMA) communication system wherein a spread-spectrum signal containing information bits is transmitted within an environment tending to produce multipath components, the method comprising the steps of:
- receiving a spread-spectrum signal having multipath components;
- selecting one or more of such multipath components based on predetermined selection criteria;
- determining time delays between such selected multipath components;
- determining weighting factors for such selected multipath components;
- processing the spread-spectrum signal by operation thereon by time-delayed versions of a user-correlation signal to produce processed signal components, such time-delayed versions of the user-correlation signal being delayed according to the determined time delays of the selected multipath components;
- integrating each processed signal component during a predefined time period to produce corresponding integration results;
- multiplying each integration result by a corresponding determined weighting factor to produce weighted products;
- summing the weighted products from the predefined time period to produce a summed output; and
- decoding the summed output by quantizing such output and comparing such output to a predefined threshold value, thereby to extract the information bits from the summed output.

10. The method of claim 9, wherein the user-correlation signal is a user code sequence defined by multiplying a PN sequence by an orthogonal cover sequence.

11. For use in receiving apparatus of a code division multiple access (CDMA) communication system which includes a rake receiver for presenting multipath components of a received spread-spectrum signal on plural diversity branches and a combiner for combining outputs of the diversity branches to produce a combined signal and a decoder for decoding the combined signal to extract coded information from the combined signal, the improvement comprising:
- an adaptive search engine which receives the spread-spectrum signal and a cell-correlation signal, the engine being coupled to the combiner to identify selected multipath components of the spread-spectrum signal for combination, the search engine including:
  - a slope signal generator for generating successive time delay values;
  - a variable time delay which receives time delay values from said slope signal generator to produce successive time-delayed versions of the cell-correlation signal;
  - a processor arrangement which processes the spread-spectrum signal by operation thereon by said successive time-delayed versions of the cell-correlation signal to produce successive multipath correlation components;
  - an integrator for integrating each successive multipath correlation component over a predefined interval of time to produce successive integration results; and
  - a tracking engine for tracking a predefined number of maximal integration results produced by said integrator and determining corresponding weighting factors for use by the combiner.

12. The improvement of claim 11, wherein said integrator performs integration in accordance with a trapezoidal rule.

13. For use in a communication system which employs a spread-spectrum signal having multipath components, a receiving apparatus comprising:
- a search engine which receives the spread-spectrum signal for operation thereon by a first quantity of time-delayed versions of a cell-correlation signal, said search engine being configured to select a second lesser, quantity of multipath components based on predetermined selection criteria and being configured to produce time delay signals representing the time delay between such selected multipath components and weighting factors for each selected multipath component;
- a combiner for weighing said selected multipath components using said weighting factors and combining such weighted multipath components in a predetermined manner to produce a combined signal; and
- a decoder operatively coupled with said combine to extract information from the combined signal.

14. The receiving apparatus of claim 13, wherein said predetermined selection criteria directs selection of multipath components having maximal correlation between such multipath component and said cell-correlation signal.

15. A receiving apparatus for use in a code division multiple access (CDMA) communication system which receives a spread-spectrum signal having multipath components, the receiving apparatus comprising:
- an adaptive search engine which dynamically tracks the multipath components of the spread-spectrum signal for selecting multipath components with a maximal level of correlation between the multipath component and a cell-correlation signal, said search engine including a multiplier for multiplying the received signal by time-delayed versions of said cell-correlation signal to produce multipath correlation components, said search engine further including an integration arrangement for integrating each multipath correlation component over an information bit time interval;
- a diversity receiver including plural diversity branches, each of which receives a selected multipath component;
- a combiner for combining the diversity branches in a predetermined manner to produce a combined signal, thereby to increase diversity gain; and
- a decoder operatively coupled with said combiner to extract information.

16. The receiving apparatus of claim 15 which further comprises normalizing the combined signal prior to decoding.

17. The receiving apparatus of claim 16, wherein the combined signal is normalized by dividing the combined signal by a sum of squares of selected channel coefficient magnitudes to produce a normalized signal.

18. A method for increasing diversity gain in a code division multiple access (CDMA) communication system, the method comprising the steps of:
- receiving a spread-spectrum signal having multipath components;
- determining a signal-to-noise power ratios of each multipath component by a sliding average approach;
- selecting one or more of the multipath components with maximal signal-to-noise power ratios as determined by said sliding average approach;
- combining the selected multipath components in such manner as to maximize diversity gain, thereby to produce a combined signal representing such selectively combined maximized-gain diversity components; and
- decoding the combined signal to extract information from the combined signal.

* * * * *